US008656185B2

(12) United States Patent
Furusawa et al.

(10) Patent No.: US 8,656,185 B2
(45) Date of Patent: Feb. 18, 2014

(54) HIGH-ASSURANCE PROCESSOR ACTIVE MEMORY CONTENT PROTECTION

(75) Inventors: Michael Masaji Furusawa, Chino Hills, CA (US); Chieu The Nguyen, Irvine, CA (US)

(73) Assignee: SafeNet, Inc., Belcamp, MD (US)

( * ) Notice: Subject to any disclaimer, the term of this patent is extended or adjusted under 35 U.S.C. 154(b) by 1810 days.

(21) Appl. No.: 11/191,755

(22) Filed: Jul. 28, 2005

(65) Prior Publication Data

US 2006/0023486 A1    Feb. 2, 2006

Related U.S. Application Data

(60) Provisional application No. 60/593,015, filed on Jul. 30, 2004, provisional application No. 60/593,016, filed on Jul. 30, 2004.

(51) Int. Cl.
 *G06F 12/14* (2006.01)
(52) U.S. Cl.
 USPC ............... 713/193; 713/189; 726/34; 726/36; 711/133; 711/134
(58) Field of Classification Search
 USPC ...................... 726/34–36; 713/300, 340, 189, 713/193–194; 711/133, 134
 See application file for complete search history.

(56) References Cited

U.S. PATENT DOCUMENTS

| | | | | |
|---|---|---|---|---|
| 3,649,848 A | * | 3/1972 | Ross ............................ | 327/434 |
| 5,163,161 A | * | 11/1992 | Bowles et al. ............. | 455/164.1 |
| 5,263,003 A | * | 11/1993 | Cowles et al. ........... | 365/230.03 |
| 5,363,447 A | * | 11/1994 | Rager et al. .................... | 380/273 |
| 6,233,685 B1 | * | 5/2001 | Smith et al. ................... | 713/194 |
| 6,272,637 B1 | * | 8/2001 | Little et al. .................... | 713/194 |
| 6,292,898 B1 | * | 9/2001 | Sutherland ....................... | 726/34 |
| 6,505,302 B1 | * | 1/2003 | Matyas et al. ................ | 713/169 |
| 6,779,099 B2 | * | 8/2004 | Hou ............................... | 711/170 |
| 6,928,551 B1 | * | 8/2005 | Lee et al. ....................... | 713/165 |
| 6,981,153 B1 | * | 12/2005 | Pang et al. ..................... | 713/194 |
| 7,103,782 B1 | * | 9/2006 | Tugenberg et al. ........... | 713/194 |
| 7,218,567 B1 | * | 5/2007 | Trimberger et al. .......... | 365/228 |
| 7,383,445 B2 | * | 6/2008 | Tomohiro ...................... | 713/193 |
| 7,457,951 B1 | * | 11/2008 | Proudler et al. .............. | 713/164 |
| 2001/0021965 A1 | * | 9/2001 | Yokota et al. ................. | 711/163 |
| 2002/0002683 A1 | * | 1/2002 | Benson et al. ................ | 713/194 |

OTHER PUBLICATIONS

DS5240 High-Speed Secure Microcontroller Datasheet, "datasheets.maxim-ic.com/en/ds/DS5240.pdf", 2002.*

(Continued)

*Primary Examiner* — Yin-Chen Shaw
(74) *Attorney, Agent, or Firm* — Drinker Biddle & Reath LLP

(57) ABSTRACT

A method and apparatus for preventing compromise of data stored in a memory by assuring the deletion of data and minimizing data remanence affects is disclosed. The method comprises the steps of monitoring the memory to detect tampering, and if tampering is detected, generating second signals having second data differing from the first data autonomously from the first processor; providing the generated second signals to the input of the memory; and storing the second data in the memory. Several embodiments are disclosed, including self-powered embodiments and those which use separate, dedicated processors to generate, apply, and verify the zeroization data.

33 Claims, 5 Drawing Sheets

(56) References Cited

OTHER PUBLICATIONS

Gutmann, Peter, "Data Remanence in Semiconductor Devices", IBM T.J. Watson Research Center, Proceedings of the 10$^{th}$ USENIX Security Symposum, Washington D.C., USA, Aug. 13-17, 2001.*

Jacob A. van der Pol et al., "Relation between the hot carrier lifetime of transistors and CMOS SRAM products", CH2787-0/90/0000-0178 ©, 1990 IEEE/IRPS.

Peter Gutmann, "Data Remanence in Semiconductor Devices", IBM T.J. Watson Research Center.

Yoonjong Huh et al., "Hot-Carrier-induced Circuit Degradation in Actual DRAM", 0-7803-2031-X/95 ©, 1995 IEEE.

Jian Tao et al., "Metal Electromigration Damage Healing Under Bidirectional Current Stress", IEEE Electron Device Letters, vol. 14, vol. 12, Dec. 1993.

Jian Tao et al, "An Electromigration Failure Model for Interconnects Under Pulsed and Bidirectional Current Stressing", IEEE Transactions on Electron Devices, col. 41, No. 4, Apr. 1994.

T. Endoh et al., New Write/Erase Operation Technology for Flash EEPROM Cells to Improve the Read Disturb Characteristics, ULSI Research Center Toshiba Corporation, 0-7803-0817-4/92 © 1992 IEEE, IEDM 92-603.

Peter Gutmann, "Secure Deletion of Data from Magnetic and Solid-State Memory", Sixth USENIX Security Symposium Proceedings, San Jose, CA, Jul. 22-25, 1996.

William Mehuron, Director, Information Technology Laboratory, "Security Requirements for Cryptographic Modules", Federal Information Processing Standards Publication, FIPS PUB 140-2, Issued May 25, 2001.

* cited by examiner

HIGH-ASSURANCE PROCESSOR ACTIVE MEMORY CONTENT PROTECTION

CROSS-REFERENCE TO RELATED APPLICATIONS

This application claims benefit of U.S. Provisional Patent Application No. 60/593,015, entitled "HIGH-ASSURANCE PROCESSOR ACTIVE MEMORY CONTENT PROTECTION," by Michael Masaji Furusawa and Chieu T. Nguyen, filed Jul. 30, 2004, and U.S. Provisional Patent Application No. 60/593,016, entitled "HIGH-ASSURANCE SECURE BOOT CONTENT PROTECTION," by Michael Masaji Furusawa, and Chieu T. Nguyen, filed Jul. 30, 2004, which applications are hereby incorporated by reference herein.

This application is related to the following co-pending and commonly assigned patent application, which application is also incorporated by reference herein:

Application Ser. No. 11/191,552, entitled "HIGH-ASSURANCE SECURE BOOT CONTENT PROTECTION," Jul. 28, 2005 by Michael Masaji Furusawa and Chieu T. Nguyen.

BACKGROUND OF THE INVENTION

1. Field of the Invention

The present invention relates to data protection systems and methods, and in particular to a system and method for preventing compromise of data stored in a memory due to data remanence.

2. Description of the Related Art

One possible avenue to obtain access to otherwise secure data is to carefully scan the storage media or memory for data that was incompletely deleted from the data storage device. Incomplete erasure of data is a problem with both magnetic and optical storage media and electronic semiconductor memory. Such incomplete erasure arises from magnetic persistence in magnetic media and deformations in optical media. In semiconductors, remanence can have serious affects on volatile random access memory (RAM) and non-volatile memory (Flash) technologies. Remanence is known to be influenced by hot-carrier effects (which charges the semiconductor devices), electro-migration (which physically changes the semiconductor devices), and environmental dependencies affecting remanence including voltage and temperature.

Data remanence issues can be solved using techniques that range from performing repetitive read and write operations of known data patterns to memories and the development of new semiconductor technologies.

An effective way to avoid short-term data retention is to ensure that no memory cell can hold a quantity of data for more than a certain amount of time. Similarly, an effective way to avoid long-term storage effects is to periodically flip the stored data bits as suggested in the 1996 paper (Titled "Secure Deletion of Data from Magnetic and Solid-State Memory", Peter Gutmann, *Proceedings of the 6th Usenix Security Symposium*, July 1996, p. 77.) so that each cell never holds a value long enough for it to be permanently or temporarily "remembered". Although impractical for large amounts of data, this may be feasible for small amounts of sensitive data such as cryptographic key variables.

Long-term retention effects are most likely to occur when the same data is repeatedly fed through a specialized circuit. For example, in cryptography there may be a repeated use of an identical private key variable in a cryptographic circuit that performs an encryption algorithm. This condition is common in specialized cryptographic circuits, as opposed to general-purpose processor circuits, which constantly processes all sorts of different data types that cannot be distinguished at any given time. In contrast, a private key stored in a tamper resistant hardware circuit that is input repeatedly by a cryptographic processor will lead to some circuits (and signals) always carrying the same information and leading to pronounced long-term hot-carrier degradation and electro-migration effects.

One method of actively reducing the effects of electro-migration (as opposed to passively allowing the memory to revert back to its un-programmed 'ground' state) is to apply a reverse-current, which reverses the electro-migration stress, effectively undoing the electro-migration damage. Similar techniques are already used in some EEPROM/Flash devices to reduce repeated erasure stress by applying a reverse-polarity pulse after an erase pulse.

A somewhat more complex and difficult-to-implement approach is to have a cryptographic processor write known false 'dummy' data to memory when it isn't processing real sensitive data or keys. A disadvantage of this method is it requires that a crypto operation be interruptible once started. Unfortunately, alternating dummy and real data is complicated by the design of typical crypto devices.

High-assurance security methods may also include encryption of the active data in working memory. This method might just be a deterrence, since a similar (as a matter of fact, perhaps even more critical and more elaborate) protection must be provided for the vital secret parameters (crypto variables, credentials, etc.) in conjunction with encrypting the data. If encryption of the memory is performed without protecting the vital secret parameters, the encrypted data could still be vulnerable to attacks, because if the critical secrets were recovered, the encrypted data can thus be decrypted.

Another solution to this problem is to use zeroization techniques to erase the cryptographic variables under appropriate circumstances. This provides limited security protection if not performed effectively or quickly. Federal Information Processing Standard 140-2 (FIPS 140-2) specifies the requirement for zeroizing plain text data and keys but does not specify the method of performing such action, when such action should take place or how this requirement is to be implemented.

However, the foregoing solutions are limited in their application and/or effectiveness. For example, the continuous flipping of data is impractical for larger data sets. Zeroizing data is effective, but is vulnerable to malicious software and hardware intervention. Both zeroization and reverse current techniques are typically performed at slower speeds by the same processors that are used in normal operational modes. This limits their effectiveness, and current random access memory (RAM) and FLASH memory technologies are moving to still higher speeds.

Using alternative data processing techniques such as key switching incurs the overhead of a key schedule. Further, pipelined implementations of block ciphers are generally not interruptible, and require completion of processing of the current block (and in some cases several more blocks to force the data pipeline to be flushed) before a key change can take effect.

Further, the foregoing techniques are difficult to implement in systems having high-performance computing platforms and associated memories that are decoupled from the computer motherboard. Such designs are also expected to become more commonplace.

References discussing data remanence and methods to ameliorate it include "Data Remanence in Semiconductor Devices", Peter Gutmann, *IBM T.J. Watson Research Center*, Proceedings of the 10th USENIX Security Symposium, Washington, D.C., USA—Aug. 13-17, 2001; "Relation between the hot carrier lifetime of transistors and CMOS SRAM products", Jacob van der Pol and Jan Koomen, *Proceedings of the International Reliabily Physics Symposium* (IRPS 1990), April 1990, p. 178; "Hot-carrier-induced Circuit Degradation in Actual DRAM", Yoonjong Huh, Dooyoung Yang, Hyungsoon Shin, and Yungkwon Sung, *Proceedings of the International Reliabiliy Physics Symposium (IRPS* 1995), April 1995, p. 72; "Metal Electromigration Damage Healing Under Bidirectional Current Stress", Jiang Tao, Nathan Cheung, and Chenming Ho, *IEEE Electron Device Letters*, Vol. 14, No. 12 (December 1993), p. 554; "An Electromigration Failure Model for Interconnects Under Pulsed and Bidirectional Current Stressing", Jiang Tao, Nathan Cheung, and Chenming Ho, *IEEE Transactions on Electron Devices*, Vol. 41, No. 4 (April 1994), p. 539; "New Write/Erase Operation Technology for Flash EEPROM Cells to Improve the Read Disturb Characteristics", Tetsuo Endoh, Hirohisa Iizuka, Riichirou Shirota, and Fujio Masuoka, *IEICE Transactions on Electron Devices*, Vol. E80-C, No. 10 (October 1997), p. 1317; and "Security Requirements for Cryptographic Modules", Federal Information Processing Standards Publication, FIPS PUB 140-2 (May 25, 2001), all of which are hereby incorporated by reference herein.

Accordingly, there is a need for a system and method for protecting stored data that avoids the need to constantly flip data within a large memory space, can be performed reliably high speeds, does not require constant processing of alternative data, allows flexibility in the use of memory modules and in modifying external interfaces between the CPU and the memories, and provides adequate security from malicious software while not requiring that the crypto or general purpose processor used with the memory be a trusted processor. The present invention satisfies that need by providing hardware-based protection that provides higher assurance data zeroization techniques deterring data recovery from semiconductor RAM devices (due to remanence) that can be implemented into conventional computing platforms, without having the expense of inventing new semiconductor technologies.

SUMMARY OF THE INVENTION

To address the requirements described above, the present invention discloses a method and apparatus for preventing compromise of data stored in a memory, by assuring the deletion of data and minimizing data remanence affects. In one embodiment, the method comprises the steps of monitoring the memory to detect tampering, and if tampering is detected, generating second signals having second data differing from the first data autonomously from the first processor; providing the generated second signals to the input of the memory; and storing the second data in the memory. Several embodiments are disclosed, including self-powered embodiments and those which use separate, dedicated processors to generate, apply, and verify the zeroization data. The invention can also be practiced as a circuit for protecting data stored in a memory by a processor. The circuit comprises a tamper detector, for generating a tamper signal indicative of an attempt to tamper with the memory; a zeroization generator, for generating zeroization data in response to the tamper signal autonomously from the processor; and a selector, for selectably coupling a processor and the zeroization generator to the memory according to the tamper signal.

The foregoing provides hardware-based protection that yields higher assurance data zeroization techniques, thus deterring remanence data recovery from semiconductor RAM, EEPROM, or FLASH devices. This technique can also be implemented with conventional computing platforms, without incurring the expense of new semiconductor technologies.

One embodiment of the invention provides for a self-powered passive zeroization mode, which provides protection against discovery of remanence-related data even when the primary power of the computing platform under protection has been removed or defeated. The invention can be implemented by a module that can be added to commercial CPU circuit boards, or an embeddable circuit that can be designed into CPU circuit boards. Although aiming at RAM, this invention applies to other Semiconductor technologies (such as EEPROM, FLASH) as well.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
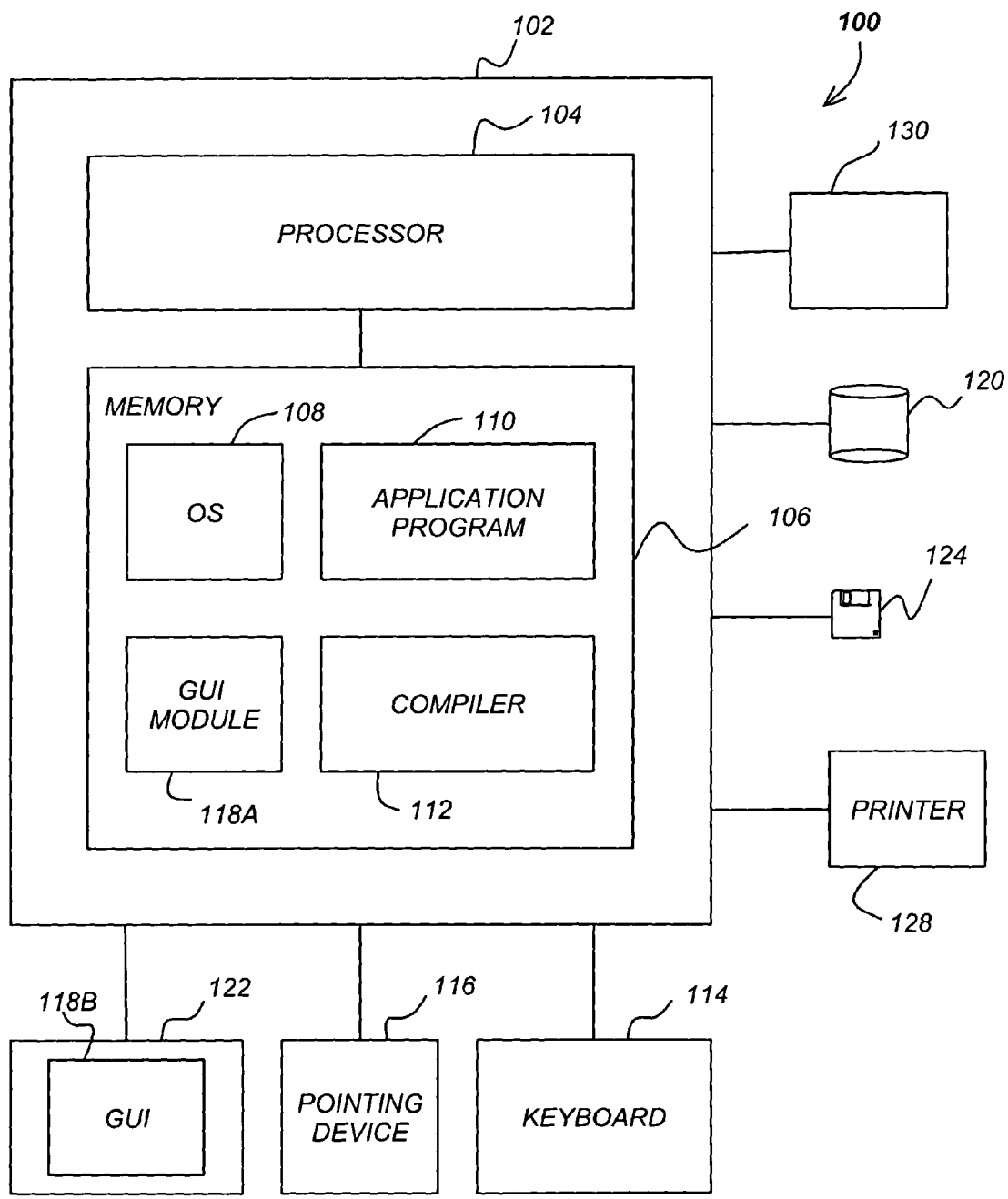
FIG. 1 illustrates an exemplary computer system that could be used to implement the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112. The computer 102 also optionally comprises an external communication device such as a modem, satellite link, Ethernet card, or other device for communicating with other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer application program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
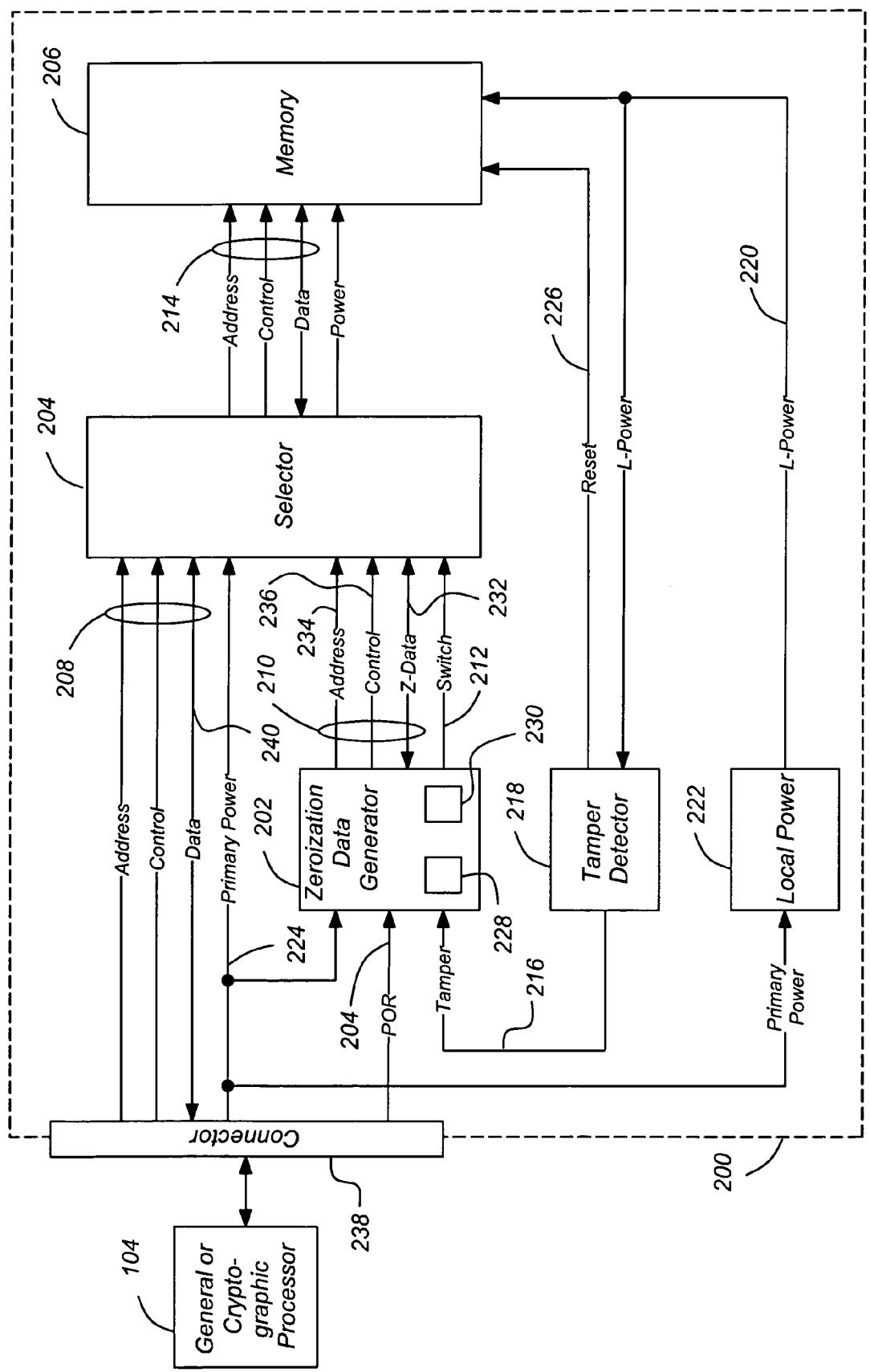
FIG. 2 is a diagram of a circuit depicting one embodiment of the present invention.

FIG. 2 is a diagram of a circuit 200 depicting one embodiment of the present invention. The circuit 200 comprises a tamper detector 218, which provides a tamper signal 216 indicative of an attempt to tamper with a memory 206 to a communicatively coupled zeroization data generator (ZDG) 202.

The ZDG 202 provides signals a first signal group 210 comprising address data, control data, and zeroization data to a communicatively coupled selector 204. Also coupled to the selector 204 is second signal group 208 comprising address data, control data, and operating data. The selector 204 selectably provides either the first signal group 210 or the second signal group 208 as a selected signal group 214 to the memory 206, based upon a switch signal 212 obtained from the ZDG 202.

Tamper Detector

A variety of different tampering techniques can be detected, including (1) physical intrusion of the memory package, (2) excessively low or high temperatures, (3) excessively low or high primary power voltage 224 and (4) excessively low or high battery voltages. If tampering is detected, the tamper detector 218 generates a tamper signal 216 and optionally generates a reset signal 226 as well.

In one embodiment, the tamper signal is provided to the ZDG 202 to generate zeroization data if tampering is detected and primary power remains available via the primary power signal 224 (hereinafter referred to as "active zeroization"), while a reset signal 226 is provided to the memory 206 if tampering is detected and primary power is not available (hereinafter referred to as "passive zeroization"). In another embodiment, the tamper signal 216 and the reset signal 226 are provided when tampering is detected, regardless of the status of the primary power provided by signal 224.

Zeroization Generator

The ZDG 202 is powered by the primary power signal 224. Power may also be provided by the local power supply 222 if tampering is detected. The ZDG 202 is also nominally reset by the processor 104 upon power-on or reset conditions via power-on-reset (POR) signal 204.

The ZDG 202 comprises an internal oscillator 228 and a clock 230 that is independent from the that of the processor 104. This oscillator 228 and clock 230 remains in a standby or inactive state until the tamper signal 216 is received from the tamper detector 218. Upon receiving the tamper signal 216, the ZDG 202 generates zeroization data 232 that is used to effectively erase the data stored in the memory 206 without remanence effects, and generates and sends a switch signal 212 to the selector 204 to command the selector 204 to provide the zeroization data 232 along with the appropriate address 234 and control 236 data that forms the first signal group 208 to the memory 206 in place of the ordinary (non-tamper) operational data that is provided in second signal group 210. To generate the zeroization data 232, the ZDG tamper signal activates circuitry that is in a standby or inactive state before tampering is detected. This circuitry may include special purpose discrete circuitry, special purpose processor(s), or general purpose processor(s) or any combination thereof. In one embodiment, activation of the ZDG 202 upon receipt of the tamper signal 216 from the tamper detector 218 includes enabling a ZDG oscillator 228 and a ZDG clock 230. Using this circuitry and/or processors, the ZDG 202 generates one or more sets of data signals that are used to zeroize the data in memory 206, and also, to optionally verify that the zeroization process was successfully completed, as described in further detail below.

Local Power Supply

The circuit 200 also comprises a local power supply 222, communicatively coupled to the memory 206, the tamper detector 218, and optionally, the zeroization data generator 202. The local power supply 222 provides local power to these components so that they can complete their function when and after tampering is detected, even if the primary power 224 is removed. This includes providing local power to the tamper detector 218 upon removal of the primary power 224 and providing burst power to the memory 206 to allow the memory 206 to be reset.

In one embodiment, the local power supply 222 is a battery that is charged by the primary power signal 224.

The local power supply 222 may also provide power to the appropriate components even when no tampering is detected. For example, if the local power signal 220 is continuously provided to the tamper detector 218 (even during periods when the memory or packaging is not tampered with), this signal can be used to determine if there has been any tampering with the local power generator 222, perhaps as the first step to tampering with the memory 206 or other components of the circuit 200.

The diagram shown in FIG. 2 illustrates an embodiment of the invention in which the circuit 200 is a custom memory module. In this embodiment, the active memory 206, ZDG 202, tamper detector 218, and local power supply 222 are all in a single package, and interface with the processor 104 via connector 238.

Figure 3:
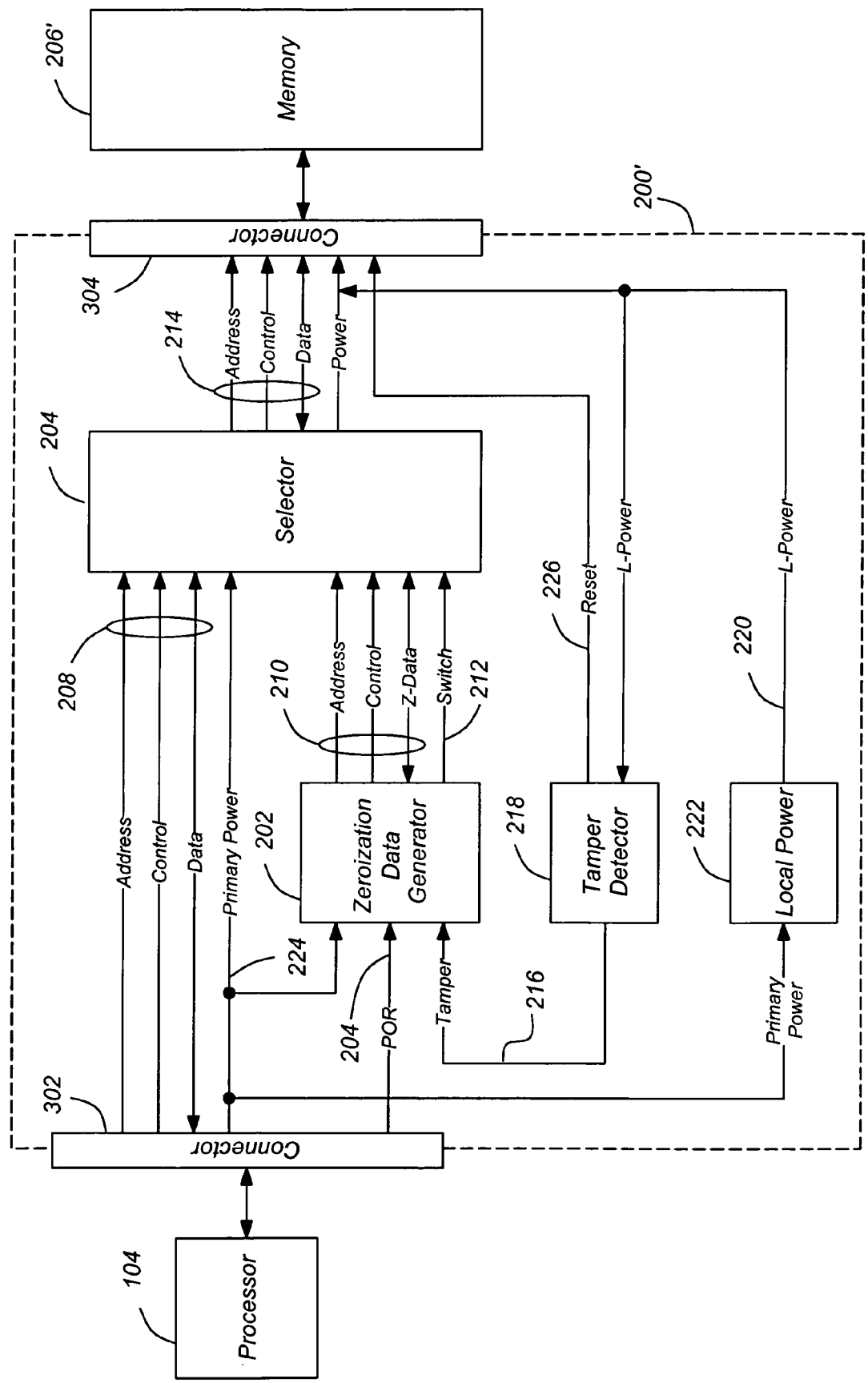
FIG. 3 is a diagram illustrating another embodiment of the invention in which the circuit 300 active memory 206 is external to the circuit 200.

FIG. 3 is a diagram illustrating another embodiment of the invention in which the circuit 200' active memory 206' is external to the circuit 200'. In this embodiment, an external memory module 206' is coupled to the processor 104 via an alternative circuit 200' via processor/circuit connector 302 and circuit/memory connector 304. This embodiment operates in substantially the same way as the embodiment shown in FIG. 2, however this embodiment provides local power to the memory 206 via connector 304 using the same conductor as the primary power line from the selector 204 to the connector 304. This embodiment can be added to commercial CPU boards to prevent remanence problems from compromising the security of the data stored in the memory 206'.

Figure 4A:
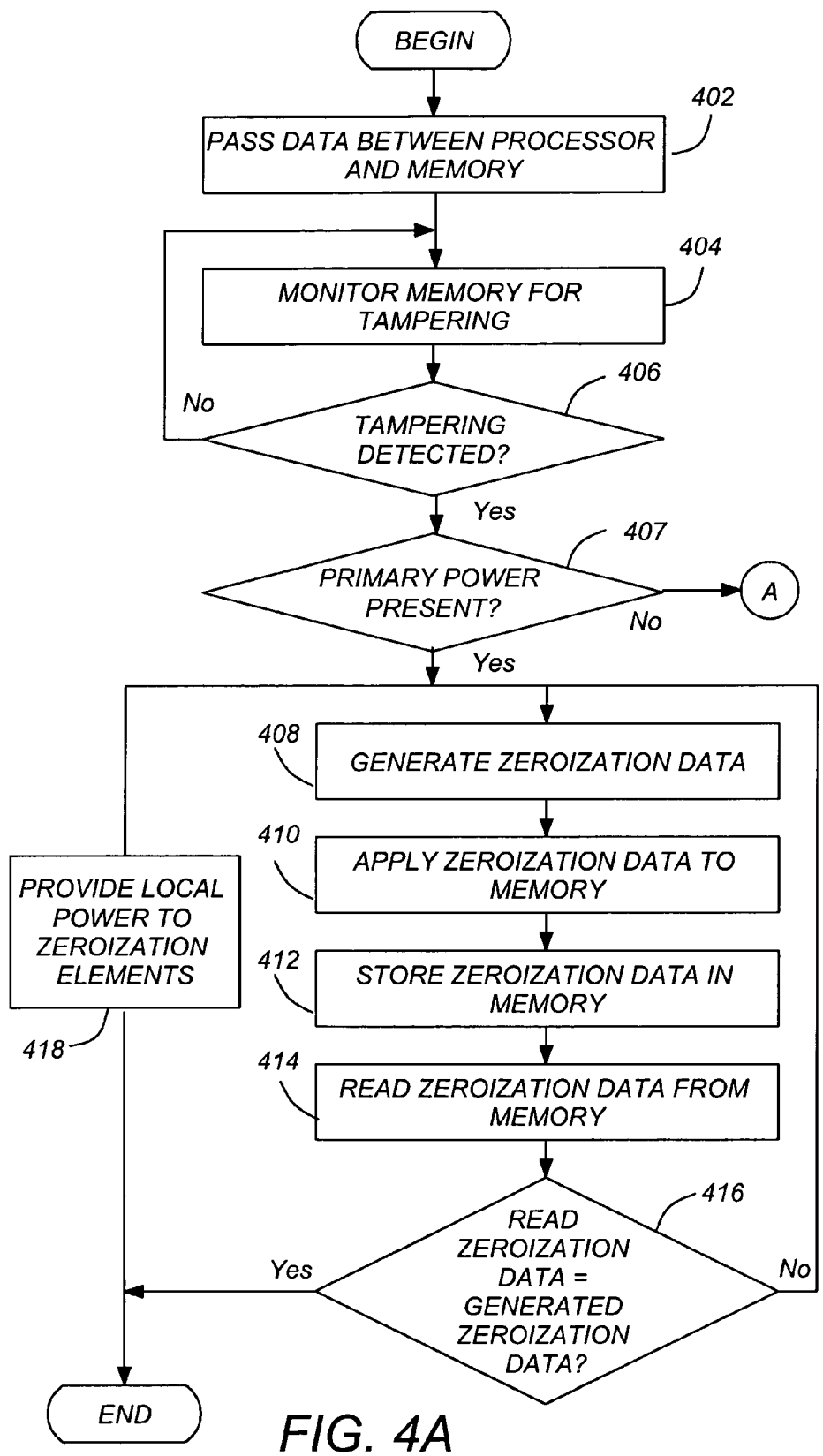
FIG. 4A is a flow chart illustrating exemplary process steps that can be used to perform the active data zeroization techniques described above.

FIG. 4A is a flow chart illustrating exemplary process steps that can be used to perform the active data zeroization techniques described above. In ordinary (non-tamper condition) operation, data 240 is passed between the processor 104 and the memory 206, as shown in block 402. The memory 206 is monitored for a tampering condition as discussed above, as shown in block 404. This can be accomplished by detecting a tamper condition such as a physical intrusion of the package in which the memory 206 or other elements are contained, an aberrant package temperature (e.g. excessively high, low, or with a temporal history that is abnormal), or an aberrant supply of voltage to the package (e.g. also abnormally high, low or with an abnormal temporal history). A tamper condition may also be determined as a function of the foregoing conditions (e.g. higher than normal temperature and lower than normal voltage) to prevent false alarms. Block 406 continues the monitoring function of block 404 until tampering is detected, in which case, processing is passed to blocks 408 and 418.

If tampering is detected, a check is made to determine if primary power is present, or if it is absent or has been defeated, as shown in block 407. If primary power is absent or defeated, processing passes to block "A" which describes passive zeroization. If primary power is present, active zeroization is initiated. As shown in blocks 408-412, signals having data different than the ordinary data 240 are generated, applied to the memory 206 and stored in the memory 206. In one embodiment, this is accomplished by the ZDG 202, and the selector 204 in response to the tamper detector 218 shown in FIGS. 2 and 3.

In one embodiment, the generation, application, and storage of the zeroization data 232 is accomplished by the use of a plurality of zeroization data sets. For example, in a preferred embodiment of the invention, zeroization data 232 comprises a first data set comprising first pseudorandom data, a second data set comprising second pseudorandom data, a third data set comprising only ones and a fourth data set comprising only zeroes. These data sets are applied to and stored in the memory 206 in order, first overwriting the data stored by the processor 104 and later overwriting the previous zeroization data sets. Hence, the data previously stored in the memory 206 is first overwritten by pseudorandom data, that pseudorandom data is written over by pseudorandom data, the second pseudorandom data is written over by all ones and the ones are written over by zeroes. Other data set patterns can also be used. For example, the last step could be to store all ones rather than all zeroes.

Note that the ZDG can generate all of the zeroization data sets all at once, store them for use in the memory one at a time, or can generate them and pass them along to the memory as they are generated. Also note that in embodiments where pseudorandom data is used, that data can be generated by a pseudorandom number generator in the ZDG 202, or by a number of techniques known in the art.

Optionally, the zeroization data can be read to verify that the zeroization process has satisfactorily eliminated data remanence. In one embodiment, this is accomplished by reading the data from the memory and comparing it to the zeroization data that was last generated and stored in the memory 206. The method by which the zeroization data is read from the memory 206 preferably mimics that which a hacker might use to take advantage of data remanence to gain access to the data (for example, by modifying the power supply to the memory). If the read zeroization data matches the data that was last stored (the data that last overwrote what was stored in the memory 206), the process has completed, and the process ends. If the read data does not match, or if the read zeroization data otherwise indicates that complete zeroization has not occurred, processing loops to block 408 to repeat the process as many times as is required. This is shown in blocks 414 and 416.

While the operations in blocks 408-416 are performed, local power is provided to zeroization elements (e.g. the tamper detector 218, memory 206, and optionally, the ZDG 202). This is shown in block 418.

Figure 4B:
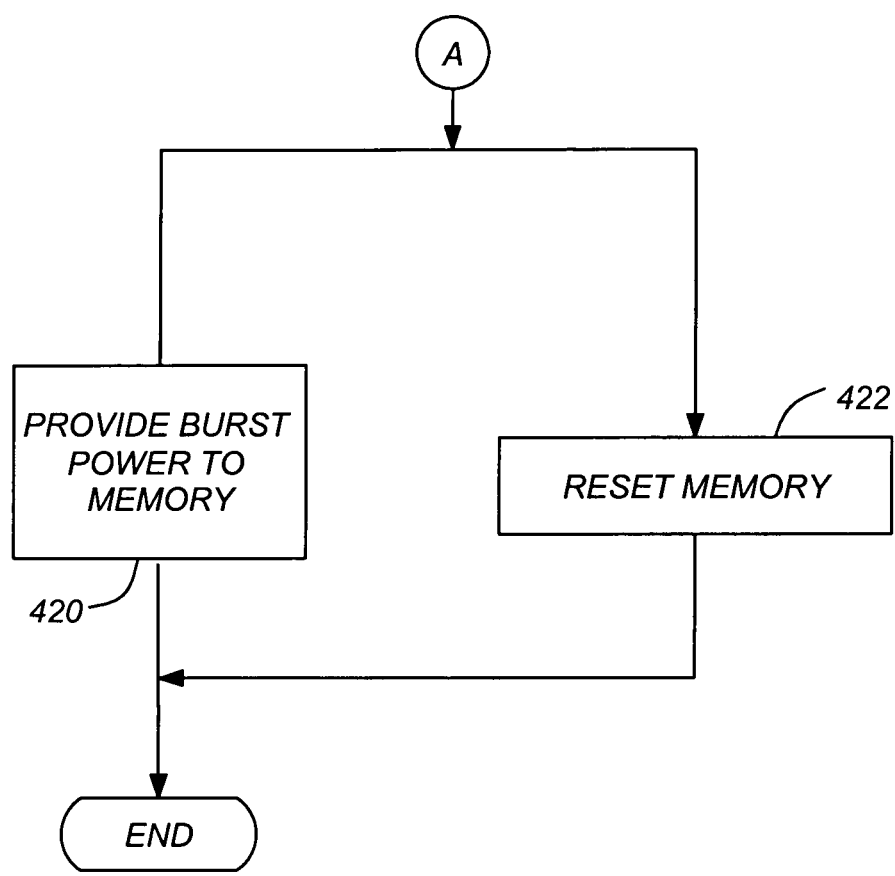
FIG. 4B is a flow chart illustrating exemplary process steps that can be used to perform passive data zeroization.

FIG. 4B is a flow chart illustrating exemplary process steps that can be used to perform passive data zeroization. These steps are performed if tampering is detected (as shown in block 407 of FIG. 4A, and primary power is either absent or defeated). In this instance, burst power is provided to the memory 206 as shown in block 420, while the memory 206 is reset, as shown in block 422.

While FIGS. 4A and 4B illustrate that the memory 206 is reset only if primary power is unavailable or disabled, the present invention can be implemented by resetting the memory before the zeroization process depicted in blocks 408-414 and 418 take place.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of preventing compromise of first data stored in a volatile memory communicatively coupled to a first processor, the first data provided via communication of first signals between the first processor and an input of the memory, comprising the steps of monitoring the memory to detect tampering;

if tampering is detected, performing steps comprising:
  decoupling the memory from the first processor;
  autonomously generating second signals independently of the first processor, the second signals having data comprising control, address, and zeroization data as second data for the memory;

providing the generated second signals to the input of the memory;

ameliorating remanence of the first data in the memory due to memory cell charge decay time, hot carrier effects, and electromigration by storing the second data as applied zeroization data to overwrite the first data stored in the memory at the generated address with the second data;

reading the stored zeroization data;

verifying that the read zeroization data matches the applied zeroization data; and if the read zeroization data does not match the applied zeroization data, applying further zeroization data and storing the further zeroization data.

2. The method of claim 1, wherein the memory is disposed in a package and the step of monitoring the memory to detect tampering comprises the step of monitoring a tamper condition selected from the group consisting of:

a physical intrusion of the package;

an aberrant package temperature; and an aberrant supply of power to the package.

3. The method of claim 1, wherein the step of providing the generated second signals to the input of the memory comprises switching the input of the memory from the first signals to the generated second signals.

4. The method of claim 1, further comprising the step of:

repeatedly performing said steps of reading, verifying, and applying further zeroization data until the read zeroization data matches the applied zeroization data.

5. The method of claim 1, wherein the second data comprises:

a first zeroization data set comprising first pseudorandom data;

a second zeroization data set having second pseudorandom data;

a third zeroization data set comprising only ones; and a fourth zeroization data set comprising only zeroes.

6. The method of claim 5, wherein the steps of applying the generated second signals to the input of the memory and storing the second data in the memory comprise the steps of:

(a) applying the first zeroization data set to the memory and storing the first zeroization data set in the memory;

(b) applying the second zeroization data set to the memory and storing the second zeroization data set in the memory;

(c) applying the third zeroization data set to the memory and storing the third zeroization data set in the memory; and (d) applying the fourth zeroization data set to the memory and storing the fourth zeroization data set in the memory.

7. The method of claim 6, wherein steps (a)-(c) are performed in any order and step (d) is performed after steps (a)-(e).

8. The method of claim 6, wherein steps (a)-(d) are performed in sequential order.

9. The method of claim 6, wherein steps (a) and (h) are performed before steps (c) and (d) and wherein steps (c) and (d) are performed in any order.

10. The method of claim 9, further comprising the steps of:

reading the zeroization data stored in the memory after both steps (c) and (d) are performed;

verifying that the zeroization data stored in the memory comprises all zeroes if step (d) is performed after step (c) and all ones if step (c) is performed after step (d).

11. The method of claim 6, wherein the first, second, third, and fourth zeroization data sets are stored in the same portion of the memory.

12. The method of claim 1, wherein the steps performed if tampering is detected further comprise resetting the memory.

13. The method of claim 1, wherein:

if tampering is not detected, the memory is powered from a primary power source; and if tampering is detected, the steps performed further comprise providing local power to the memory.

14. A circuit for protecting first data stored in a volatile memory by a processor, comprising:

a tamper detector circuit, for generating a tamper signal indicative of an attempt to tamper with the memory;

a zeroization generator circuit, for autonomously generating data comprising control, address, and zeroization data for the memory in response to the tamper signal independently of the processor; and a selector circuit, for selectably coupling one of the processor and the zeroization generator circuit to the memory according to the tamper signal;

wherein, when the zeroization generator circuit is coupled to the processor, the zeroization data is used as applied data to overwrite the first data stored in the memory at the generated address and ameliorate remanence of the first data in the memory due to memory ceil charge decay time, hot career effects, and electromigration;

wherein the zeroization generator circuit stores the zeroization data in the memory; and wherein the zeroization generator circuit further verifies the stored zeroization data by reading the stored zeroization data from the memory and comparing the read zeroization data to the generated zeroization data.

15. The circuit of claim 14, wherein in normal operation, the memory is powered from a primary power source, and wherein the circuit for protecting the first data further comprises:

a local power supply, coupled to provide local power to the tamper detector circuit, the zeroization generator circuit, and the memory.

16. The circuit of claim 15, wherein the local power supply provides local power to the tamper detector circuit, the zeroization generator circuit and the memory upon interruption of the primary power source.

17. The circuit of claim 15, wherein the local power supply provides local power to the tamper detector circuit, the zeroization generator circuit and the memory in response to the tamper signal.

18. The circuit of claim 15, wherein the local power supply generates local power from the primary power source.

19. The circuit of claim 14, wherein the zeroization generator circuit comprises an oscillator and a clock generator.

20. The circuit of claim 14, wherein the tamper detector circuit is further coupled to provide a reset signal to the memory, the reset signal indicative of an attempt to tamper with the memory.

21. The circuit of claim 14, wherein the selector circuit selectably couples one of the processor and the zeroization generator circuit to the memory according to a switch signal provided by the zeroization generator circuit in response to the tamper signal.

22. The circuit of claim 14, wherein the zeroization data comprises a first zeroization data set comprising pseudorandom data and a second zeroization data set comprising only zeroes.

23. The circuit of claim 14, wherein the zeroization data comprises:

(a) a first zeroization data set having first pseudorandom data;

(b) a second zeroization data set having second pseudorandom data (c) a third zeroization data set having only ones; and (d) a fourth zeroization data set having only zeroes.

24. The circuit of claim 23, wherein, each zeroization data set (a)-(d) is applied to and stored in the memory in the order (a), (b), (c), and (d).

25. An apparatus for preventing compromise of first data stored in a volatile memory via communication of first signals having the first data between a processor and an input of the memory, comprising:

a tamper detector circuit for monitoring the memory to detect tampering;

a generator circuit for generating independently of the processor second signals having data comprising control, address, and zeroization data as second data for the memory, and circuitry for providing the generated second signals to the input of the memory as applied data if tampering is detected, and for storing the second data as applied zeroization data to overwrite the first data stored in the memory at the generated address and ameliorate remanence of the first data in the memory due to memory cell charge decay time, hot carrier effects, and electromigration;

wherein the generator circuit for generating the second signals comprises:

circuitry for reading the stored zeroization data;

circuitry for verifying that the read zeroization data matches the applied zeroization data; and circuitry for applying further zeroization data and storing the further zeroization data if the read zeroization data does not match the applied zeroization data.

26. The apparatus of claim 25, wherein the memory is disposed in a package and the tamper detector circuit is operative to detect a tamper condition selected from the group consisting of:

a physical intrusion of the package;

an aberrant package temperature; and an aberrant supply of power to the package.

27. The apparatus of claim 25, wherein the circuitry for providing the generated second signals to the input of the memory comprises circuitry for switching the input of the memory from the first signals to the generated second signals.

28. A secure processing method used in a secure processing device that performs The apparatus of claim of 25, wherein the generator circuit for generating the second signals comprises:

circuitry for repeatedly reading the stored zeroization data, verifying that the read zeroization data matches the applied zeroization data, applying further zeroization data and storing the further zeroization data until the read zeroization data matches the applied zeroization data.

29. The apparatus of claim 25, wherein the second data comprises:

a first zeroization data set comprising first pseudorandom data;

a second zeroization data set having second pseudorandom data;

a third zeroization data set comprising only ones; and a fourth zeroization data set comprising only zeroes.

30. The apparatus of claim 29, wherein the circuitry for applying the generated second signals to the input of the memory and storing the second data in the memory comprises:

circuitry for consecutively applying the first zeroization data set to the memory and storing the first zeroization data set in the memory, applying the second zeroization data set to the memory and storing the second zeroization data set in the memory, applying the third zeroization data set to the memory and storing the third zeroization data set in the memory, and applying the fourth zeroization data set to the memory and storing the fourth zeroization data set in the memory.

31. The apparatus of claim 30, wherein the first, second, third, and fourth zeroization data sets are stored in the same portion of the memory.

32. The apparatus of claim 25, further comprising circuitry for resetting the memory if tampering is detected.

33. The apparatus of claim 25, further comprising:

circuitry for powering the memory from a primary power source if tampering is not detected; and circuitry for providing local power to the memory independent of the primary power source if tampering is detected.

* * * * *